United States Patent [19]

Gilmore et al.

[11] Patent Number: 4,718,729

[45] Date of Patent: Jan. 12, 1988

[54] MATERIAL CLEARING AND PILING DEVICE

[75] Inventors: Carl D. Gilmore, South Milwaukee; Melvin W. Kraschnewski, Racine, both of Wis.

[73] Assignee: Becor Western Inc., South Milwaukee, Wis.

[21] Appl. No.: 907,469

[22] Filed: Sep. 15, 1986

[51] Int. Cl.[4] .............................................. E21C 41/00
[52] U.S. Cl. ...................................... 299/18; 37/117; 299/25; 405/61
[58] Field of Search ....................... 299/18, 24–26; 414/133; 114/42; 405/61; 37/117

[56] References Cited

U.S. PATENT DOCUMENTS

| | | |
|---|---|---|
| 556,310 | 3/1896 | Dole . |
| 1,137,171 | 4/1915 | Stansell . |
| 1,170,484 | 2/1916 | Hadsel . |
| 1,209,988 | 12/1916 | Matthews . |
| 1,217,552 | 2/1917 | Bailey .......................... 37/117 |
| 1,243,293 | 10/1917 | Hoenecke . |
| 1,244,290 | 10/1917 | Cardwell . |
| 1,258,090 | 3/1918 | Charbondaux . |
| 1,283,932 | 11/1918 | Slocum . |
| 1,315,903 | 9/1919 | Barnes . |
| 1,534,185 | 4/1925 | Miller .......................... 37/117 |
| 1,600,343 | 9/1926 | Landrum . |
| 1,717,523 | 6/1929 | Scott . |
| 1,804,175 | 5/1931 | Massey . |
| 1,902,691 | 3/1933 | Downie . |
| 4,070,062 | 1/1978 | Morgan .................... 299/24 X |
| 4,077,225 | 3/1978 | Lichtenberger et al. ......... 299/24 X |
| 4,134,221 | 1/1979 | Scodeller ................... 37/116 |
| 4,411,080 | 10/1983 | Mann .......................... 37/117 |

FOREIGN PATENT DOCUMENTS

| | | | |
|---|---|---|---|
| 1806605 | 5/1970 | Fed. Rep. of Germany ...... 414/133 |
| 2008478 | 1/1970 | France ......................... 414/133 |

*Primary Examiner*—George A. Suchfield
*Attorney, Agent, or Firm*—Quarles & Brady

[57] ABSTRACT

An apparatus and method for clearing material from one location to a pile at another wherein a trolley member with a winch is suspended below and supported by a track which in turn is supported on a moving platform such as a drilling platform or a barge. The winch member by means of the usual lifting cable is connected to a material confining member which also is connected to a drag line cable. Movement of the trolley member over the tracks by means of the drag line will cause the material confining member to collect the material. A subsequent lifting of the lift cable as well as operation of the drag line will allow the material to be elevated and placed on a rubble pile at the side of a channel. In a preferred manner, the apparatus and method of this invention is especially suited for use in clearing ice from a channel which is previously cut by ice cutters also associated with the moving platform which carries the clearing apparatus. In a preferred manner, two of the clearing apparatus are oppositely positioned so that the material such as the ice can be moved in opposite directions from the channel and piled on opposing sides thereof.

19 Claims, 7 Drawing Figures

MATERIAL CLEARING AND PILING DEVICE

BACKGROUND OF THE INVENTION

This invention relates to an apparatus for clearing debris from one location and placing it in on a pile in another. More particularly, this invention relates to an apparatus and method for clearing ice from a channel wherein a self-lifting trolley member is utilized in conjunction with a plow-type scoop so as to move the ice from the channel and place it on a pile alongside it.

It is known to utilize excavating machines with track or lift cables for moving material from one location and placing it in a pile in another. For example, this is shown in U.S. Pat. Nos. 1,137,171; 1,170,484; 1,209,988; 1,217,552; 1,258,090; 1,283,932; 1,315,903; 1,600,343; 1,804,175; and 4,411,080. In U.S. Pat. No. 556,310 a track is employed with a carrier B for movement thereover. It is employed to load coal from a pile to vehicles for transportation and utilizes a hoist rope E for lifting a specially constructed bucket. U.S. Pat. Nos. 1,717,523; 1,243,293; 1,244,290; 1,902,691; and 4,134,221 are representative of excavating buckets which are pulled by ropes in boom structures.

The prior art does not provide an apparatus specifically designed for removing materials such as ice from a channel to be cleared for navigation purposes. The prior art is either concerned with moving earth or loading materials such as coal.

It is an advantage of the present invention to provide an improved apparatus and method for clearing material from an area and placing it subsequently on a pile.

Another advantage is an apparatus of the foregoing type which is especially adapted to removing ice from a channel after it has been cut and piling it alongside the channel.

Still another advantage of this invention is in providing an apparatus of the foregoing type which can be used as a single unit or advantageously as a dual unit.

Yet another advantage is an ice moving and piling apparatus which is especially adapted to being utilized on a floating platform such as an oil well drilling platform or a barge, and can be retrofitted to existing equipment thus reducing cost of manufacture.

A still further advantage is an apparatus which can efficiently cut pieces of ice or the like from large masses of material.

SUMMARY OF THE INVENTION

The foregoing advantages are accomplished and the shortcomings of the prior art are overcome by the present apparatus which clears materials such as ice from one location to a pile at another location. An elevated and elongated track is supported above the material to be lifted. A trolley member is arranged to travel over the track in a reciprocating manner. A winch member is operatively located within the trolley and has a lifting cable connected to it as well as a material confining member connected to the opposite end of the lifting cable or rope. A drag cable or rope is connected to the material confining member at a point spaced from the connection with the lifting cable and a retract cable or rope is connected to the trolley. There are also provided means to retract and pay out the drag and retract cables. The trolley member is moved over the track by the drag cable. The apparatus of this invention affords movement of the material confining member in a plane transverse to the major axis of the channel from which the material is to be removed. After a sufficiently wide channel has been cleared of the material, by the lateral movement of the material confining member and the trolley member, the winch member in the trolley member can be activated to lift the material confining member and elevate the material up onto the dump pile alongside the channel. In a preferred manner, two of the elevated and elongated tracks are positioned in opposing directions and each has the support means for the tracks with the trolley members for movement thereover. Each trolley member has the previously referred to winch member and the material confining member connected to the lifting cable with the drag cable means to haul in and pay out the drag cable which is connected to each material confining member. Also preferably, the preferred manner of providing the track means is in part provided by a boom structure. The apparatus of this invention is especially suited for the removal of ice which will be cut by suitable ice cutting means and with the ice cutting means and the clearing apparatus of this invention suitably positioned on a moving platform such as an oil drilling rig or a barge. In another preferred manner, the material confining member is a plow device which is substantially crescent shaped.

A method of removing material from one location to a pile at another is also presented by the apparatus of this invention wherein a self-lifting apparatus in the form of the trolley member is reciprocally moved in a substantially single plane above the materials to be relocated. The material confining member is moved with the trolley member and by means of a drag line means connected to the material confining apparatus. The drag line is activated alone in one phase and and simultaneously with the lifting apparatus in the trolley member in another phase. This allows the material to be moved in the first plane to collect the material and subsequently to a second plane to place the material on the pile. In a preferred manner, the self-lifting apparatus is supported on a moving platform and is utilized in conjunction with the cutting of ice which is removed by the material confining member in the previously-described manner. Also preferably, two of the self-lifting apparatus are utilized and are moved in opposing directions to remove materials such as ice in opposing directions from the channel to be placed on opposing piles.

The present invention also includes an apparatus for cutting pieces of ice or the like from large masses of material. It includes a rotatable member having hollow teeth positioned on the periphery of the rotatable member. The hollow teeth have a closed end wall. A first passageway extends from the end wall in the rotatable member and outwardly from the rotatable member. A second passageway communicates between the hollow teeth and the first passageway. A deflector means is constructed and arranged inside the rotatable member to direct cut material from the teeth outwardly from the rotatable member and in a direction away from the end wall of the rotatable member. In a preferred manner the rotatable member is an open ended drum like member and the deflector means is a conical element having a larger base portion centrally aligned with the end wall of the rotatable member. The teeth are disposed in a radial manner over the periphery of the drum like member and are substantially U-shaped in cross section.

BRIEF DESCRIPTION OF THE DRAWINGS

A better understanding of the apparatus and method of this invention will be had by reference to the drawings wherein.

DESCRIPTION OF THE EMBODIMENTS

Figure 1:
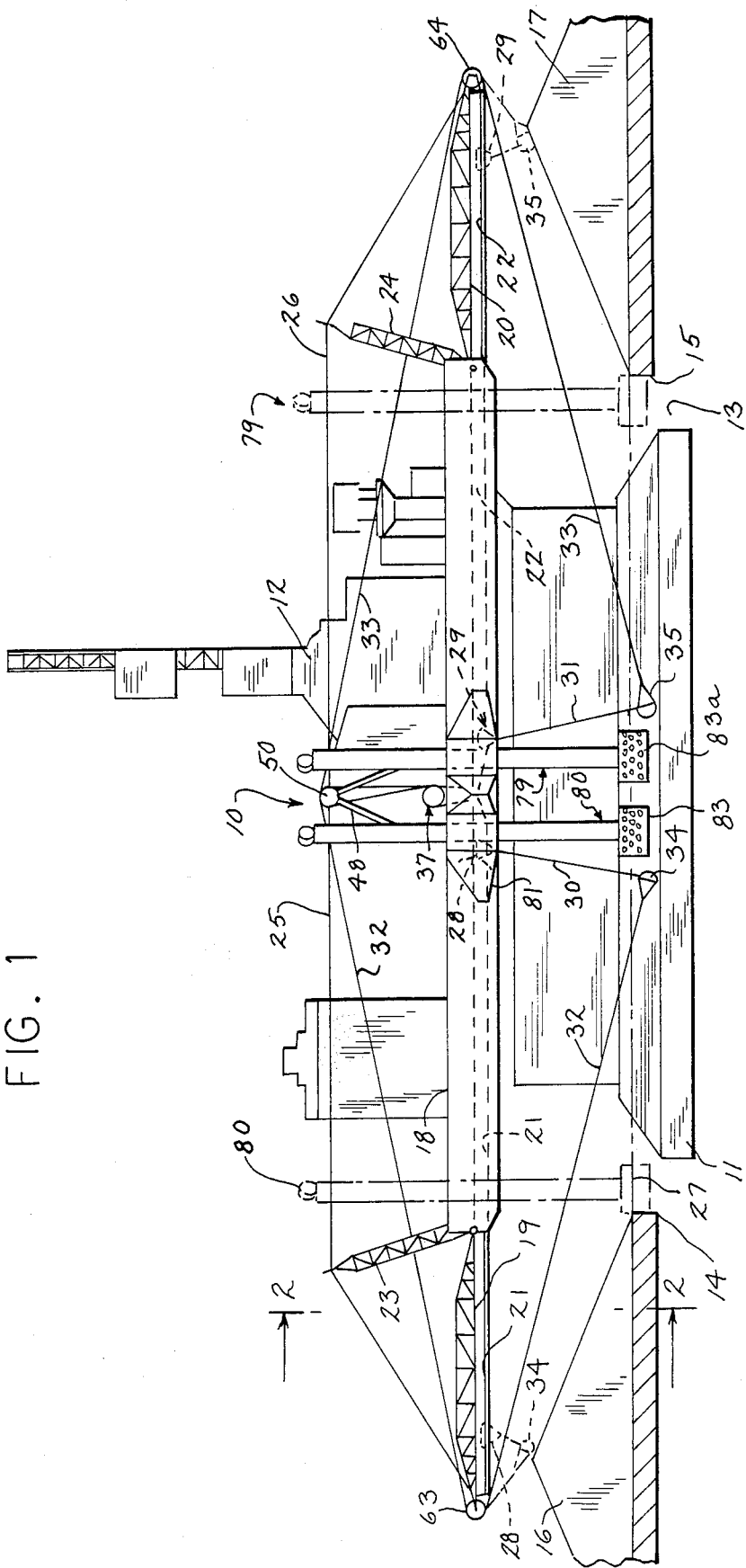
FIG. 1 is a diagrammatic view and in side elevation showing the material clearing and piling device of this invention.
Figure 2:
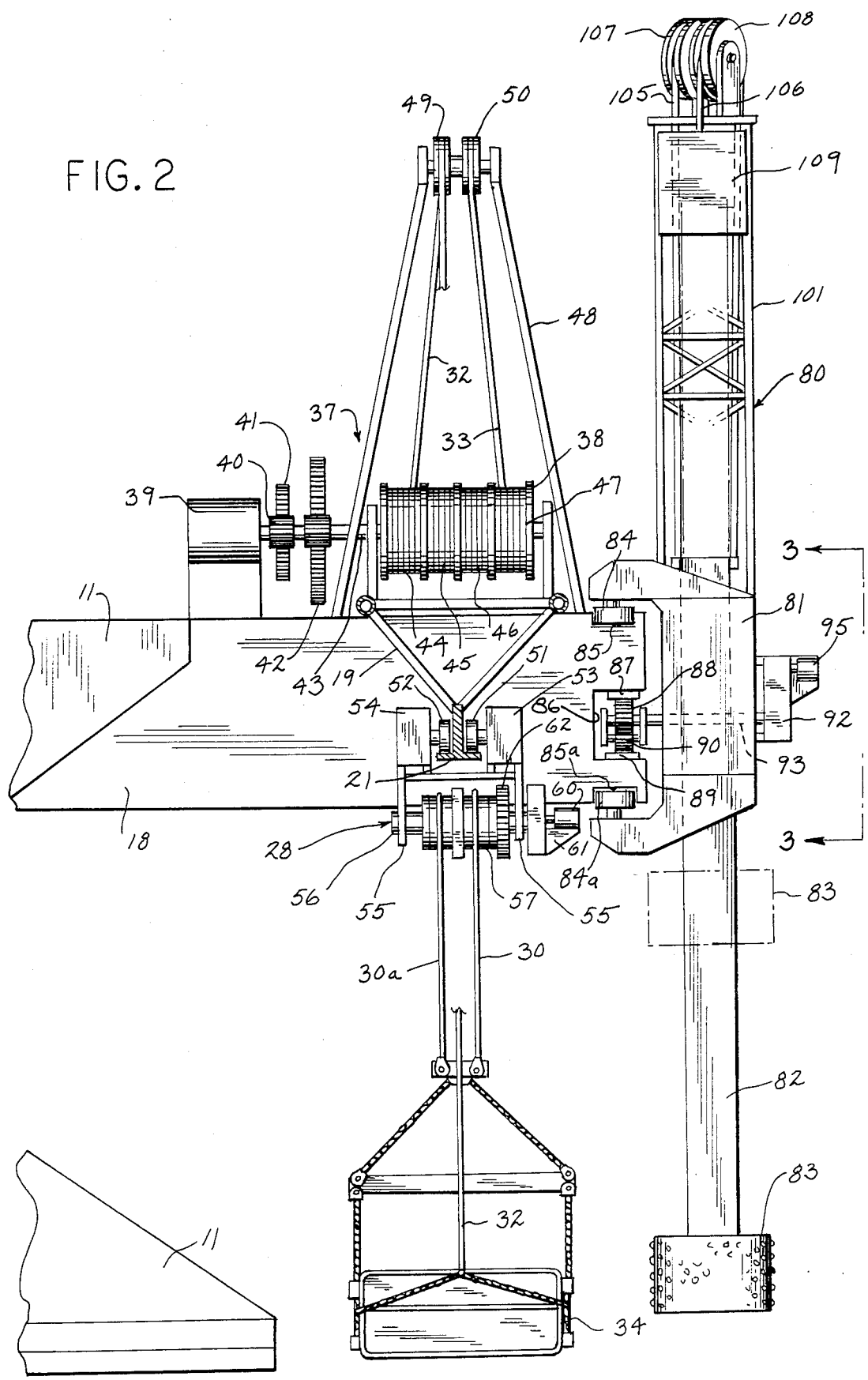
FIG. 2 is an enlarged view taken along line 2—2 of FIG. 1.

Proceeding to a detailed description of the embodiments of the present invention and particularly FIGS. 1 and 2, the material clearing device generally referred to at 10 can be utilized in conjunction with the drilling platform 11 which will mount the usual oil well drilling rig 12. The platform is of the type which can be floated on the water as indicated by the water level 27. The numeral 13 indicates a channel which has been cut through the ice and numerals 14 and 15 show the boundry ice layers. Two ice rubble piles 16 and 17 will be provided on the ice layers by means of the material clearing device 10 of this invention.

As best seen in FIG. 2, the material clearing device 10 is supported from the front of the platform 11 by the deck extension 18. Extending from opposite ends of the extension 18 are two booms 19 and 20 having the tracks 21 and 22. (See FIG. 1.) These booms 19 and 20 will be supported by the masts 23 and 24 which will support the ropes 25 and 26 secured at one end to the booms 19 and 20 and at the other end to the A-frame support 48. Two trolley members 28 and 29 are reciprocally supported on the tracks 21 and 22, respectively, which extend below the booms 19 and 20 as well as into the deck extension 18. The trolley 28 has the hoist ropes 30 and 30a for connection with the material confining member or scoop 34. Similarly, the trolley 29 has the hoist rope 31 and will have a similar hoist rope such as 30a for connection with the scoop 35. Drag ropes 32 and 33 are also connected to the scoops 34 and 35 respectively and are operatively connected at the opposing ends to the drive assembly 37. The operation of the drive assembly 37 is further explained in conjunction with FIGS. 2 and 5.

Figure 5:
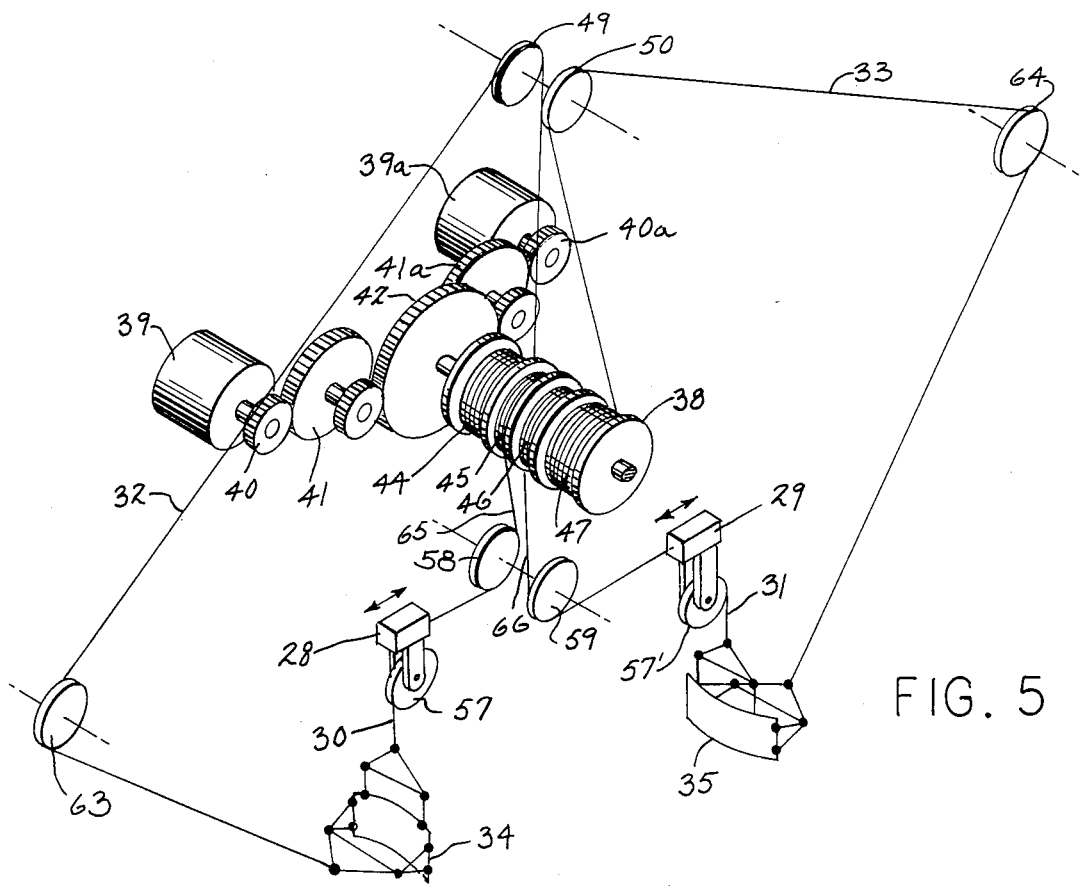
FIG. 5 is a diagrammatic view illustrating the drive means for moving the ice clearing scoops in a reciprocating manner.

Referring to FIGS. 2 and 5, it is seen that the drive assembly 37 includes motors 39 and 39a for driving drive gears 40 and 40a which in turn drives the pinions 41 and 41a and in turn drives the drum gear 42 and the drum 38. The drum 38 will have four grooved sections such as 44, 45, 46 and 47. The grooved section 44 will have left-hand grooves and will wind the drag rope 32. The grooved section 45 will have left-hand grooves and is connected in an opposing manner to the retract rope 65. Grooved section 46 has right-hand grooves and is connected to the retract rope 66 while groove section 47 has right-hand grooves and will be wound to the drag rope 33. The drag ropes 32 and 33 are supported over the sheaves 49 and 50 respectively, with the rope 32 also supported by the sheave 63 and the rope 33 supported by the sheave 64. The retract ropes 65 and 66 are guided by the sheaves 60 and 59 and are ultimately connected to the trolleys 28 and 29, respectively. The upper sheaves 49 and 50 are supported by the A-frame 48.

Each of the trolleys 28 and 29 are of the same construction so only the trolley 29 is explained in detail. Referring specifically to FIG. 2, it will include the opposing rollers 51 and 52 supported from the support housings 53 and 54 which have extending therefrom the supports 55. An axle 56 extends between them and supports the drum 57 over which is wound the hoist ropes 30 and 30a to provide a winch. The drum is rotated by the motor 60 connected to the usual speed reducer 61.

Figure 6:
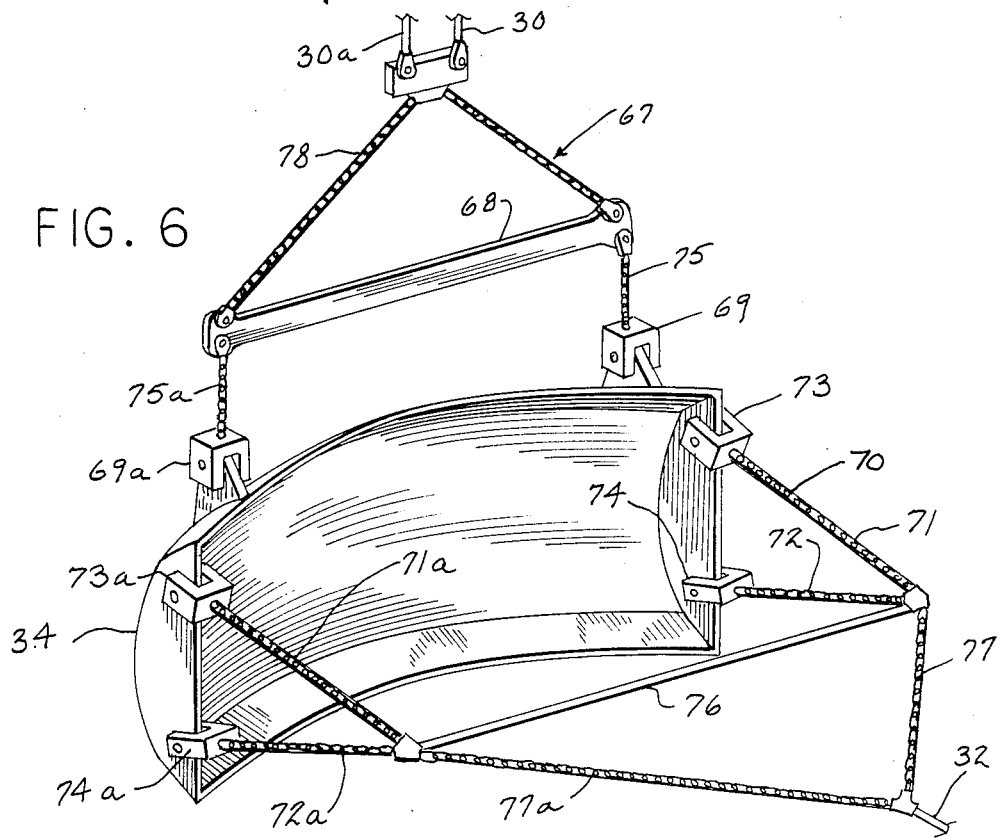
FIG. 6 is an enlarged perspective view of one of the ice clearing scoops.

Each of the scoops 34 and 35 are the same so that only the details of scoop 34 is described in FIG. 6. It has a support structure generally 67 which will include the cross member 68 interconnected to the pivotal blocks 69 and 69a by the chains 75 and 75a. These will support the back of the scoop 34 such as by the chains 78. Connected to the front of the scoop is a hitch 70 provided by the pivotal blocks 73 and 73a as well as the pivotal blocks 74 and 74a. These are connected to the cross bar 76 by the chains 71 and 71a as well as 72 and 72a. Chains 77 and 77a provide the connection with the drag rope 32.

Figure 3:
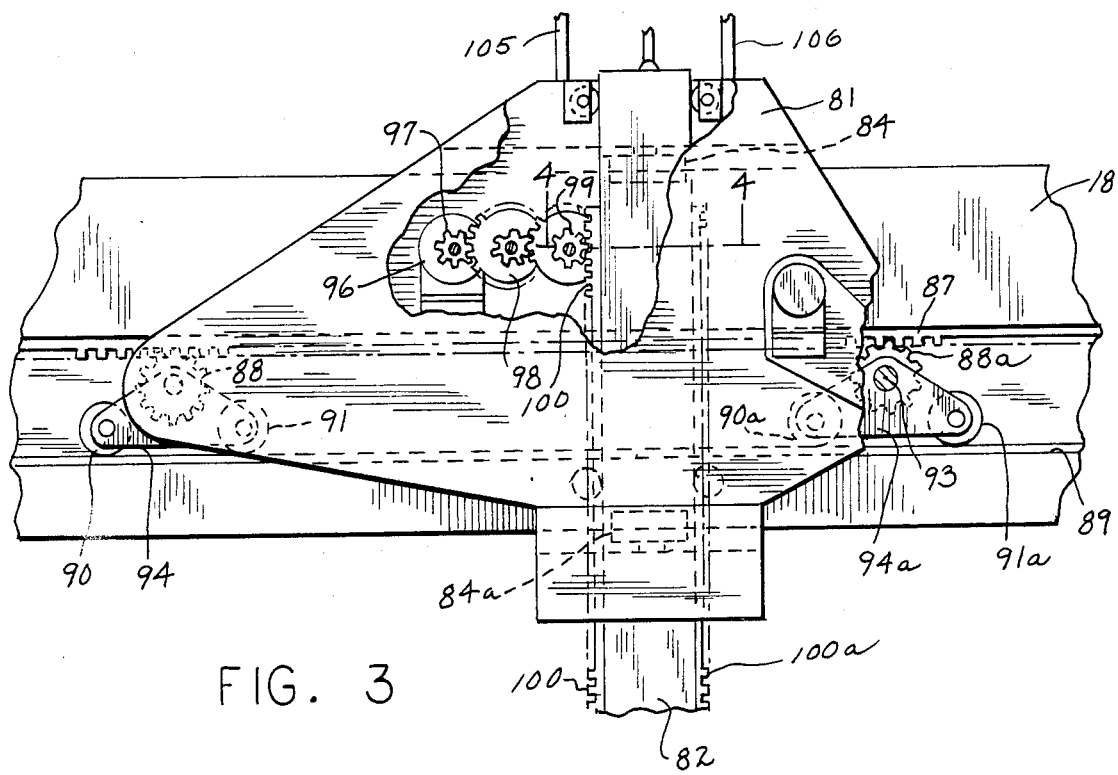
FIG. 3 is an enlarged view taken along line 3—3 of FIG. 2.

Two cutter assemblies 79 and 80 are also mounted on the deck extension 18. As both cutter assemblies 79 and 80 are the same only assembly 80 will be described in detail. Referring specifically to FIG. 2, it has a carriage 81 which is movable over the front of the deck extension 18. It supports the spud 82 and the cutter head 83 for vertical and horizontal movement. The deck extension 18 has the opposing tracks 85 and 85a for receiving the horizontal rollers 84 and 84a connected to the carriage 81. It also has the central track 86 with a rack 87 at the top and the guideway 89 at the bottom. As best seen in FIG. 3, the rack 87 is engaged by the pinion 88 as well as the pinion 88a. These pinions are connected in a bogie assembly which include the carriages 94 and 94a with the rollers 90, 90a and 91 and 91a for riding on the opposing guideway 89. The pinion 88a is driven by the shaft 93 connected to the gear reducer 92 which in turn is powered by the motor 95 both of which are carried by the carriage 81.

Figure 4:
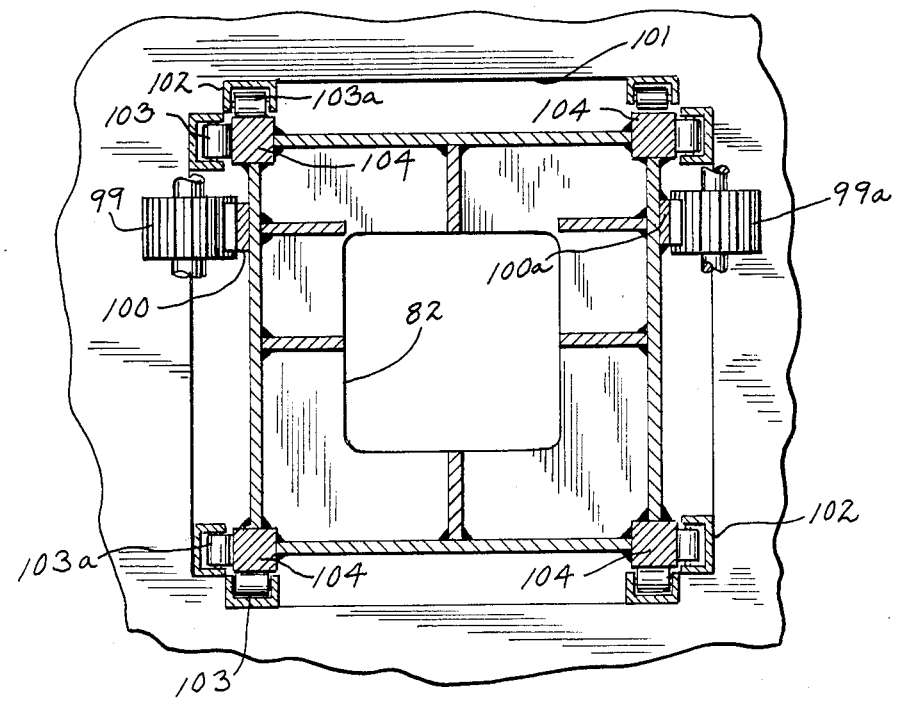
FIG. 4 is a view in horizontal section taken along line 4—4 of FIG. 3.

A drive means for moving the spud 82 of the cutter assembly 80 in a vertical manner is shown in FIGS. 3 and 4. As the drive means for both cutter assemblies 79 and 80 are the same only one is shown. It has the drive motor 96 for driving the drive gear 97 which in turn drives the pinion 98 for driving the gear 99. The gear 99 will engage the rack 100 on the spud 82. Similarly, the opposing gear 99a engages the opposing rack 100a and acts as a support guide. The spud 82 is telescopingly received in tubular-like housing 101 having the corners 102 with the rollers 103 and 103a rotatably supported in each of the corners. These rollers engage the corner supports 104 of the spud 82 for guiding purposes.

Referring to FIGS. 2 and 3, it is seen that the spud 82 is supported by a counter balancing weight system which includes the cables 105 and 106 connected thereto and extending over the sheaves 107 and 108 at the top of the housing 101. Each of the cables will be connected to a counter weight such as shown at 109.

The same counter balancing weight system is employed for cutter assembly 79.

Figure 7:
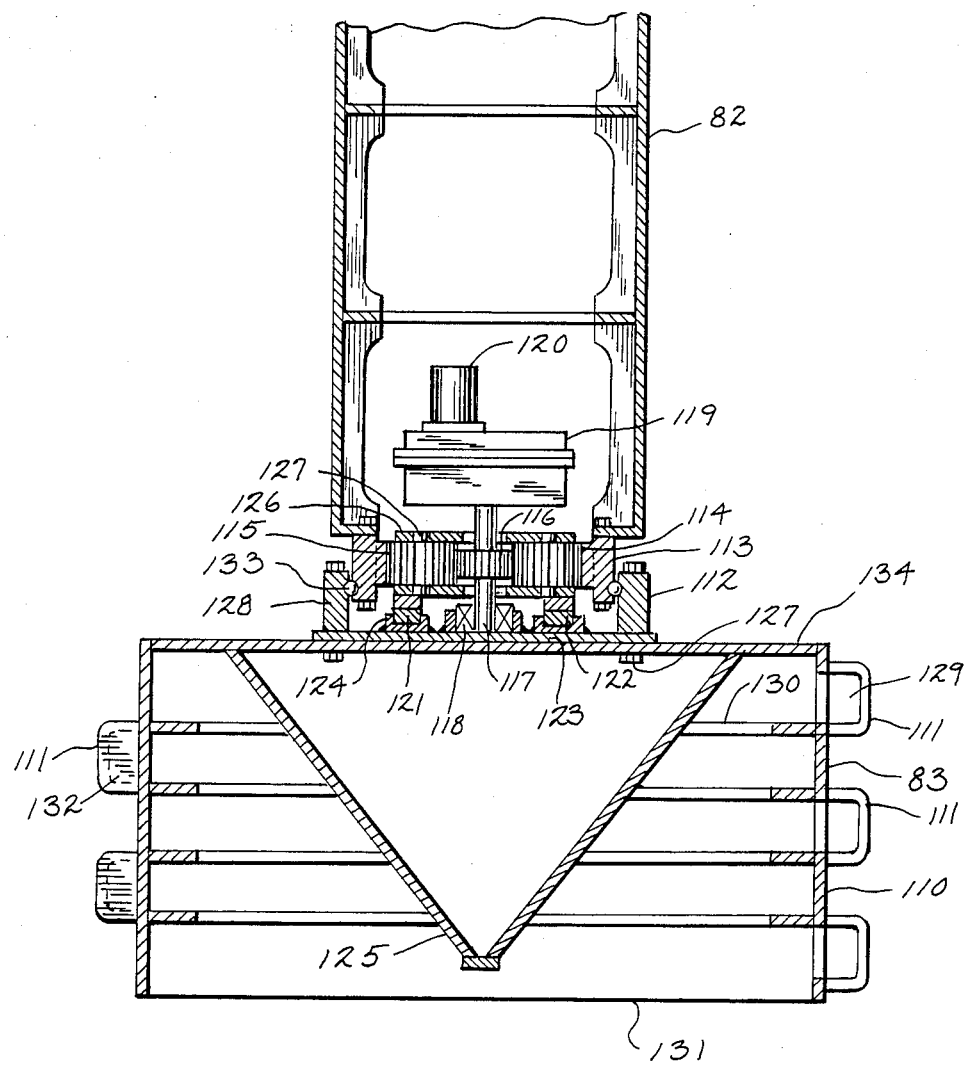
FIG. 7 is an enlarged view in vertical section illustrating the drive mechanism for the cutter assemblies as well as the cutter apparatus.

As best seen in FIG. 7 the cutter head 83 includes the cutter drum 110 from which extends the cutter teeth 111. The teeth 111 are open faced and hollow. They have a passageway 129 therein which communicates with passageway 130 in the drum 110. Drum 110 has a closed end wall 134 at the top and is open at the bottom 131. A continuous passageway is thereby afforded through the drum 110. In a preferred manner, the length of the teeth 111 as viewed as extending circumferentially over the periphery of the drum 110 would preferably be twice the width with the width being measured transversely thereto and from top to bottom as best seen in FIG. 7. The spacing of the teeth 111 over the drum 110 would preferably be 3× the width of the teeth 111.

Drum 110 is rotated by the drive motor 120 and the drive box 119. The drive pinion gear 116 is driven by the shaft 117 which in turn is driven by the drive box 119. Drive pinion gear 116 will drive three sun gears (two of which are shown at 114 and 115). These are rotatably supported in the housing 126 by the usual shafts 127. The housing rotates around the shaft 117 and has connected thereto annular resilient member 122 for frictionally engaging the annular resilient member 121. Resilient member 121 is connected to the drum 110 by the retainer 124 secured to the plate 123 which in turn is connected to the drum 110 by bolts 127. The planetary drive gear also includes the usual annular bearing 128 composed of the outer race 112 and the inner race 113 with the balls 133 therebetween. Outer race 112 is secured to the drum 110 and inner race 113 is connected to the spud 82. Inner race 113 has the usual gear teeth for meshing with the sun gears 114 and 115.

OPERATION

While the operation of the material clearing device 10 should be apparent from the foregoing description, a brief description of its operation is given. As previously indicated, it will be located on a drilling rig platform 11 such as that commonly employed in northern climates where ice formation is a problem. In many instances, it is necessary to leave the drilling rig on location once it is surrounded by ice as it is not feasible to move it. The material clearing and piling device 10 of this invention allows such removal and as indicated in FIG. 2 it is easily mounted on the front of a drilling platform 11. The first operation is to cut through the ice which is afforded by means of the cutter assemblies 79 and 80. These can be lowered as well as raised vertically in front of the platform 11 by the motor such as 96 which will drive the gear 99. This gear will engage the rack 100 on the spud 82. The cutter head 83 will be rotated by the motor 120 and the planetary gearing provided by drive gear 116, sun gears 114, 115 and bearing 128 so as to effect drive rotation through members 121 and 122. The rotating cutting heads 83 are designed to initially penetrate the ice so that the cutting heads 83 can subsequently engage the ice in a lateral manner. The openings or passageways 129 in the drum 110 are of a size to produce chunks of ice about 1 foot in size. As the drum 110 rotates, the chunks contact an end or closed wall 132 in the teeth which moves them inwardly through passageway 130. As they move inwardly, they will contact deflector 125 which directs them downwardly and out through the bottom 131 of the drum 110 and into the water. This passage of the cut ice out of the path of the teeth 111 eliminates recutting and consequently reduces power requirements. The size of the ice chunks is also controlled by the size of the teeth 111 openings which also contributes to energy savings.

In order to provide a channel wide enough for the platform 11 the cutter assemblies 79 and 80 are moved laterally over the face of the deck extension 18. This is afforded by the motor 95 which will drive the shaft 93 and the pinion 88a for engagement with the rack 87. Suitable guidance will be afforded by the rollers 90, 90a, 91 and 91a. The lateral movement of the cutters 79 and 80 are indicated in the broken line showing in FIG. 1. When it is desired to raise the cutters, this will also be effected by the motor 96 with the weight of the spud 82 being counter balanced by means of the cables 105 and 106 and counter balancing weights such as 109. Ice removal is afforded by the scoops 34 and 35 and it will be appreciated that the cut ice can be removed simultaneously with the cutting thereof as the cutters 79 and 80 are positioned forward of the platform 11 in its normal direction of travel. As viewed in FIG. 1, the scoops 34 and 35 can be moved in the direction of the booms 19 and 20 by the drag lines 32 and 33 which will be wound upon the grooved sections 44 and 47 of the drum 38. This is afforded by means of the motors 39 and 39a. At the same time as the drag lines 32 and 33 are being wound onto the drum 38, the retract ropes 65 and 66 are being payed out from the grooved sections 45 and 46, respectively. It should be noted that the retract ropes 65 and 66 are connected directly to the trolley members 28 and 29. In order to raise and lower the elevation of the scoops 34 and 35, the trolleys 28 and 29 will have the support ropes such as 30 and 30a wound upon the drum 57. As the trolleys 28 and 29 effect a raising or lowering of the scoops 34 and 35 the trolleys themselves are moved outwardly along their respective tracks 21 and 20 by the drag lines 32 and 33 in one instance and retracted over their tracks by the retract ropes 65 and 66. The previously-described movement of the scoops 34 and 35 outwardly will cause the ice to be accumulated in the scoop and then dumped upon the rubble piles 16 and 17.

While not shown, it is obvious that suitable controls will be provided for the various motors for operating the drums 38 and 57 as well as the motors 95 and 96 for moving the cutter spud 82 in either a vertical or horizontal manner. They will be suitably interconnected to a control panel and placed in an operator's cab. A planetary gear arrangement is described for rotating the cutter heads 83 and 83a. Obviously any suitable drive and gear arrangement could be employed.

The material clearing device of this invention has been described in conjunction with a drilling platform, it is obvious that it is adaptable to any type of floating vessel such as a barge. Further it is not necessary that the cutting assemblies be utilized in conjunction with the ice removal scoops 34 and 35. If desired, the ice could be broken such as by means of an ice breaker boat and then the ice removed in the previously described manner by the scoops 34 and 35 which could be suitably supported on the front of a drilling platform or barge by attaching deck extension 18 thereto. Twin cutter assemblies 79 and 80 as well as twin scoops 34 and 35 have been described. While this is highly advantageous in removing ice such as from a channel, some of the advantages of the invention could be employed utilizing a single cutter assembly and a single scoop. Alternatively, a single scoop could be employed without a cutter as previously indicated. The material removing assembly of this invention has been preferably described in conjunction with the removal of floating ice. It is apparent that the material removing features which utilize the scoops 34 and 35 could be employed to remove any type of floatable debris from a body of water. The material clearing device could also be advantageously employed in conjunction with an ice breaking ship or cutter to increase the depth of ice that the ship could operate in thereby reducing energy requirements.

We claim:

1. An apparatus for transporting material from one location to a pile at another location comprising:
   elevated and elongated self sustaining track means;
   means to support said track means above material to be lifted;
   a trolley member constructed and arranged to travel over said track means;
   a winch member operatively carried by said trolley member;
   a material confining member;
   a lifting cable connected to said material confining member and said winch member;
   a drag cable connected to said material confining member at a point spaced from said lifting cable connection;
   a retract cable connected to said trolley member; and
   means to retract and pay out said drag and retract cables;
   whereby upon activating of said winch member and said retract and pay out means, said trolley member is moved in a reciprocal manner over said track means and said material confining member can be lifted to collect and elevate said material.

2. The apparatus of claim 1 wherein two of said elevated and elongated track means are positioned in opposing directions, each having said support means and said trolley member; said winch member, said material confining member, said lifting cable, said drag and retract cables and said means to retract and pay out said drag and retract cables operatively associated with said trolley members.

3. The apparatus of claim 1 wherein said track means is defined in part by a boom structure.

4. The apparatus of claim 2 operatively supported on a floating platform.

5. The apparatus of claim 4 further including ice cutting means operatively associated with said floating platform.

6. The apparatus of claim 1 wherein said lifting cable is connected to a back portion of said material confining member and said drag cable is connected to a front portion.

7. The apparatus of claim 2 operatively supported on a floating drilling rig.

8. The apparatus of claim 1 wherein said material confining member is a scoop device.

9. The apparatus of claim 8 wherein said scoop device is substantially crescent shaped.

10. A method of removing material from one location to a pile at another comprising:
    reciprocally moving a self lifting and self powered apparatus in a substantially single plane over a self sustaining track means and above material to be relocated;
    moving a material confining member connected to said lifting apparatus by means of a drag line means; and
    activating said drag line means alone in one phase and simultaneously with said lifting apparatus in another phase so that said material can be moved in a first plane to collect said material and subsequently to a second plane to place material on a pile.

11. The method of claim 10 wherein ice is cut in conjunction with said method and is removed by said material confining member.

12. The method of claim 10 wherein two of said self lifting apparatus are utilized and are moved in opposing directions.

13. The method of claim 12 wherein said self lifting apparatus is supported on a floating platform.

14. An apparatus for transporting pieces of ice from one location to a pile at another location from a floatable platform comprising:
    elevated and elongated self sustaining track means adapted to be supported from said floatable platform in a cantilevered manner;
    a trolley member constructed and arranged to travel over said track means;
    a winch member operatively connected to said trolley member;
    a material confining member;
    a lifting cable connected to said material confining member and said winch member;
    a drag cable connected to said material confining member at a point spaced from said lifting cable connection;
    a retract cable connected to said trolley member; and
    means to retract and pay out said drag and retract cables;
    whereby upon activating of said winch member and said retract and pay out means, said trolley member is moved in a reciprocal manner over said track means and said material confining member can be lifted to collect and elevate said ice.

15. The apparatus of claim 14 wherein two of said elevated and elongated self sustaining track means are adapted to be positioned in opposing directions on said floatable platform, each having said trolley member; said winch member, said material confining member, said lifting cable, said drag and retract cables and said means to retract and pay out said drag and retract cables operatively associated with said trolley members.

16. The apparatus of claim 15 operatively supported on said floatable platform.

17. The apparatus of claim 14 wherein said winch member is operatively carried by said trolley member.

18. The apparatus of claim 14 wherein said material confining material is a scoop device having a substantially crescent shape.

19. The apparatus of claim 15 wherein an extension is provided for said floatable platform for supporting said apparatus.

* * * * *